(12) United States Patent
Mason et al.

(10) Patent No.: US 11,841,047 B2
(45) Date of Patent: Dec. 12, 2023

(54) ADJUSTABLE JOINT ASSEMBLY

(71) Applicant: SAINT-GOBAIN PERFORMANCE PLASTICS RENCOL LIMITED, Coventry (GB)

(72) Inventors: Edward Mason, Bath (GB); Florian Itta, Renchen (DE); Mark Famy, Gloucester (GB)

(73) Assignee: SAINT-GOBAIN PERFORMANCE PLASTICS RENCOL LIMITED, Coventry (GB)

( * ) Notice: Subject to any disclaimer, the term of this patent is extended or adjusted under 35 U.S.C. 154(b) by 1302 days.

(21) Appl. No.: 15/954,708

(22) Filed: Apr. 17, 2018

(65) Prior Publication Data

US 2018/0306238 A1    Oct. 25, 2018

Related U.S. Application Data

(60) Provisional application No. 62/488,400, filed on Apr. 21, 2017.

(51) Int. Cl.
| | |
|---|---|
| *F16C 25/02* | (2006.01) |
| *F16C 17/10* | (2006.01) |
| *B62K 19/18* | (2006.01) |
| *B62K 25/26* | (2006.01) |

(52) U.S. Cl.
CPC .............. *F16C 25/02* (2013.01); *B62K 19/18* (2013.01); *B62K 25/26* (2013.01); *F16C 17/10* (2013.01); *F16C 2226/16* (2013.01); *F16C 2326/20* (2013.01); *F16C 2326/26* (2013.01)

(58) Field of Classification Search
CPC ..... Y10T 403/32819; Y10T 403/32827; Y10T 403/32836; Y10T 403/32844; B62K 25/04; B62K 25/048; B62K 25/24; B62K 25/26; B62K 19/18; B62K 19/24; F16C 17/10;
(Continued)

(56) References Cited

U.S. PATENT DOCUMENTS

| | | | | |
|---|---|---|---|---|
| 130,945 A | * | 8/1872 | Shiller | B62C 5/00 |
| | | | | 384/258 |
| 353,330 A | * | 11/1886 | Starley | F16C 19/38 |
| | | | | 384/571 |

(Continued)

FOREIGN PATENT DOCUMENTS

| | | | |
|---|---|---|---|
| CH | 106595 A | * | 9/1924 |
| CH | 131294 A | * | 1/1929 |

(Continued)

OTHER PUBLICATIONS

International Search Report for PCT/EP2018/059755, dated Jul. 11, 2018, 14 pages.

*Primary Examiner* — Jonathan P Masinick
(74) *Attorney, Agent, or Firm* — Abel Schillinger, LLP; Ann Palma

(57) ABSTRACT

A joint assembly including a housing including an inner diameter portion having a tapered surface; and at least one shaft having an outer diameter portion having a tapered surface that is complementary in shape to the inner diameter portion of the housing, where the shaft is adapted to rotate relative to the housing, and where the frictional fit is adjustable by modifying the axial position of the shaft relative to the housing.

20 Claims, 5 Drawing Sheets

(58) Field of Classification Search
CPC ...... F16C 25/02; F16C 25/04; F16C 2226/16; F16C 2326/20; F16C 2326/26
See application file for complete search history.

(56) References Cited

U.S. PATENT DOCUMENTS

| | | | | |
|---|---|---|---|---|
| 1,374,267 | A | * | 4/1921 | Whitehead ................ B24B 9/16 384/368 |
| 1,891,405 | A | * | 12/1932 | Ericsson ................ B41F 13/10 403/370 |
| 1,957,781 | A | | 5/1934 | Hufferd |
| 2,913,251 | A | * | 11/1959 | Herbenar ................ F16C 11/04 280/93.508 |
| 3,182,986 | A | * | 5/1965 | Brockman ............ F16F 1/3615 267/270 |
| 3,876,231 | A | | 4/1975 | Geisel |
| 4,101,227 | A | | 7/1978 | Hierbenar et al. |
| 4,191,488 | A | * | 3/1980 | Bickerton ................ B62K 19/34 403/370 |
| 4,765,770 | A | | 8/1988 | Buhl |
| 5,024,121 | A | * | 6/1991 | Hsieh ................ B60B 27/023 74/594.1 |
| 5,217,241 | A | * | 6/1993 | Girvin ................ B62K 25/28 180/227 |
| 5,230,142 | A | | 7/1993 | Roscizewski |
| 5,571,184 | A | | 11/1996 | Desatnick |
| 5,681,135 | A | | 10/1997 | Simonson |
| 5,927,741 | A | | 7/1999 | Chi |
| 8,366,131 | B2 | * | 2/2013 | O'Connor ............ B62K 19/18 280/274 |
| 2004/0254038 | A1 | | 12/2004 | Chamberlain et al. |
| 2008/0073137 | A1 | | 3/2008 | Miller et al. |
| 2012/0128280 | A1 | | 5/2012 | Ortiz et al. |
| 2012/0200062 | A1 | | 8/2012 | O'Conner |
| 2015/0017000 | A1 | * | 1/2015 | Sato ................ F16C 33/103 416/174 |
| 2016/0194051 | A1 | | 7/2016 | Seidl |
| 2016/0257371 | A1 | | 9/2016 | Droux |

FOREIGN PATENT DOCUMENTS

| | | | | |
|---|---|---|---|---|
| CN | 2195502 | Y | | 4/1995 |
| CN | 2767305 | Y | | 3/2006 |
| CN | 101484349 | B | | 9/2013 |
| CN | 103352924 | A | | 10/2013 |
| CN | 102753425 | B | | 5/2015 |
| DE | 1807049 | A1 | | 1/1970 |
| DE | 19503047 | A1 * | 8/1996 | ............ B62K 25/04 |
| DE | 19513764 | A1 | | 10/1996 |
| DE | 29904311 | U1 | | 7/1999 |
| DE | 10135622 | A1 * | 2/2003 | ............ B62K 13/00 |
| DE | 102007010790 | A1 | | 9/2008 |
| DE | 102008027413 | A1 | | 3/2010 |
| DE | 112010003321 | T5 | | 8/2012 |
| EP | 0703138 | A1 | | 3/1996 |
| EP | 0912391 | B1 | | 5/2000 |
| EP | 2406122 | B1 | | 9/2014 |
| EP | 2230168 | B1 | | 8/2016 |
| FR | 2691220 | A1 * | 11/1993 | ............ F16C 17/10 |
| FR | 2726532 | A1 | | 5/1996 |
| JP | S4834016 | B1 | | 10/1973 |
| JP | S5797789 | U | | 6/1982 |
| JP | S6415515 | A | | 1/1989 |
| JP | 2005036920 | A | | 2/2005 |
| NL | 72155 | C | | 4/1953 |
| WO | 2011020173 | A1 | | 2/2011 |
| WO | 2011048186 | A1 | | 4/2011 |
| WO | 2018192915 | A1 | | 10/2018 |

\* cited by examiner

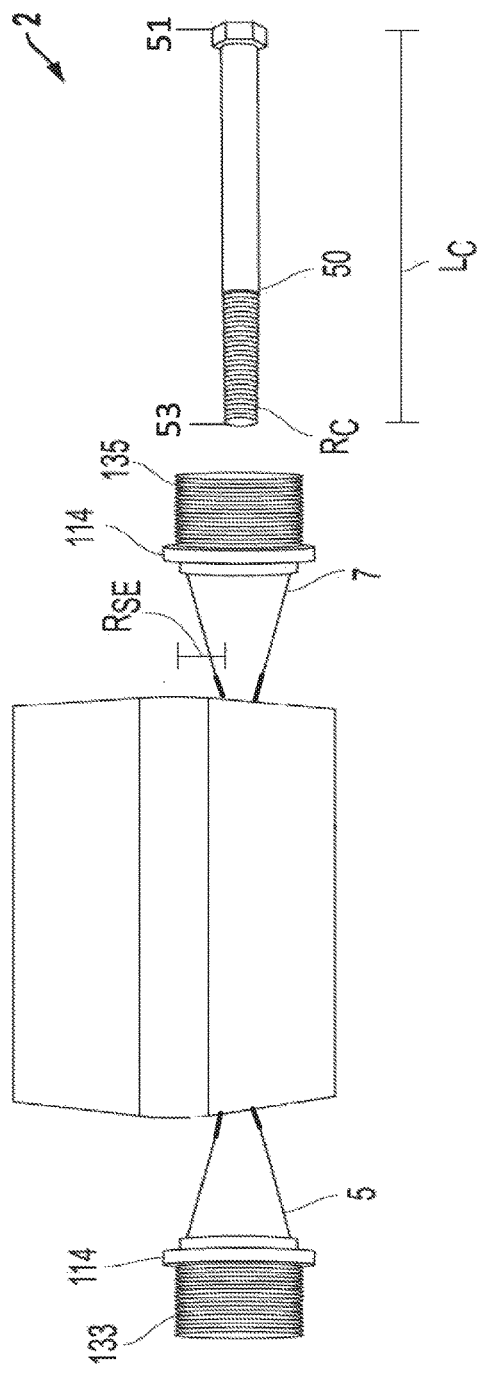
FIG. 4
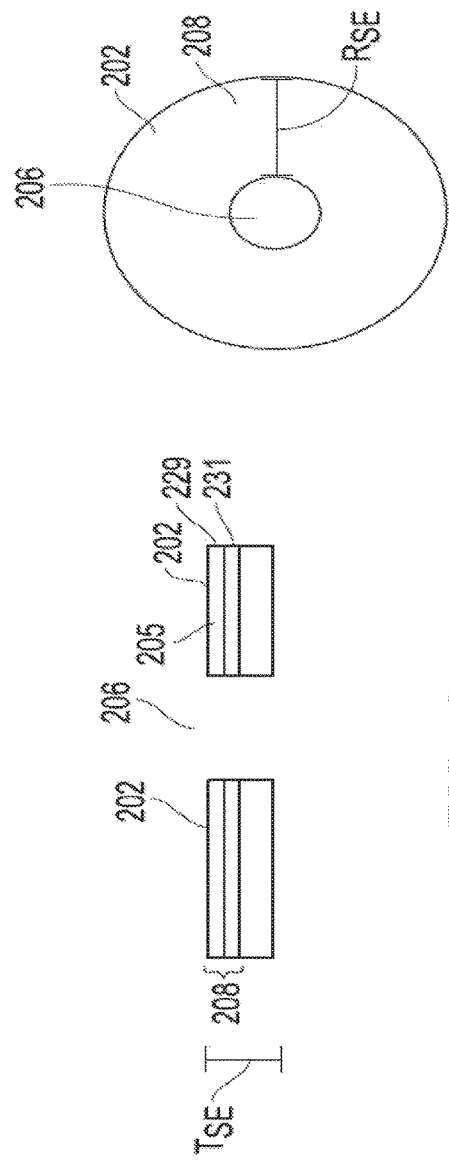
FIG. 6A
FIG. 6B

ADJUSTABLE JOINT ASSEMBLY

CROSS-REFERENCE TO RELATED APPLICATION(S)

This application claims priority under 35 U.S.C. § 119(e) to U.S. Patent Application No. 62/488,400 entitled "ADJUSTABLE JOINT ASSEMBLY," by Edward Mason et al., filed Apr. 21, 2017, which is assigned to the current assignee hereof and incorporated herein by reference in its entirety.

FIELD OF THE DISCLOSURE

This disclosure relates to an apparatus comprising mating inner and outer components, where one of the inner or outer component is able to rotate relative to the other. By non-limiting example, the apparatus can be used for a rotary joint assembly.

BACKGROUND

A joint assembly can be used to adjust, enhance, or limit the amount of torque being transferred from an inner component (such as a shaft), to an outer component (such as a housing). A joint assembly can be used in a variety of applications including vehicle frames and bicycle frames to adjust the relative position of one segment or component relative to another. Commonly, bicycle frames may include rotary joints which use ball bearings. This may create packaging and weight issues. Some bicycle frames use plain bearing rotary joints, but this leads to looseness (radial and axial free-play) which affects the tolerance related performance of the frame. Further problems can occur joint assemblies and rotary joints due to overload situations, larger size and complexity of assembly, varying torque over a lifetime due to wear or abrasion of the components of the assembly, or performance of the joint assembly components being dependent on temperature or other conditions.

BRIEF DESCRIPTION OF THE DRAWINGS

The present disclosure may be better understood, and its numerous features and advantages made apparent to those skilled in the art by referencing the accompanying drawings.

FIG. 4 is a cut-away unassembled side view of a joint assembly according to an embodiment of the invention;

FIG. 6A is a cross-sectional view of a spring element according to an embodiment of the invention; and FIG. 6B is a perspective view of a spring element according to an embodiment of the invention.

The use of the same reference symbols in different drawings indicates similar or identical items.

DETAILED DESCRIPTION

Figure 1:
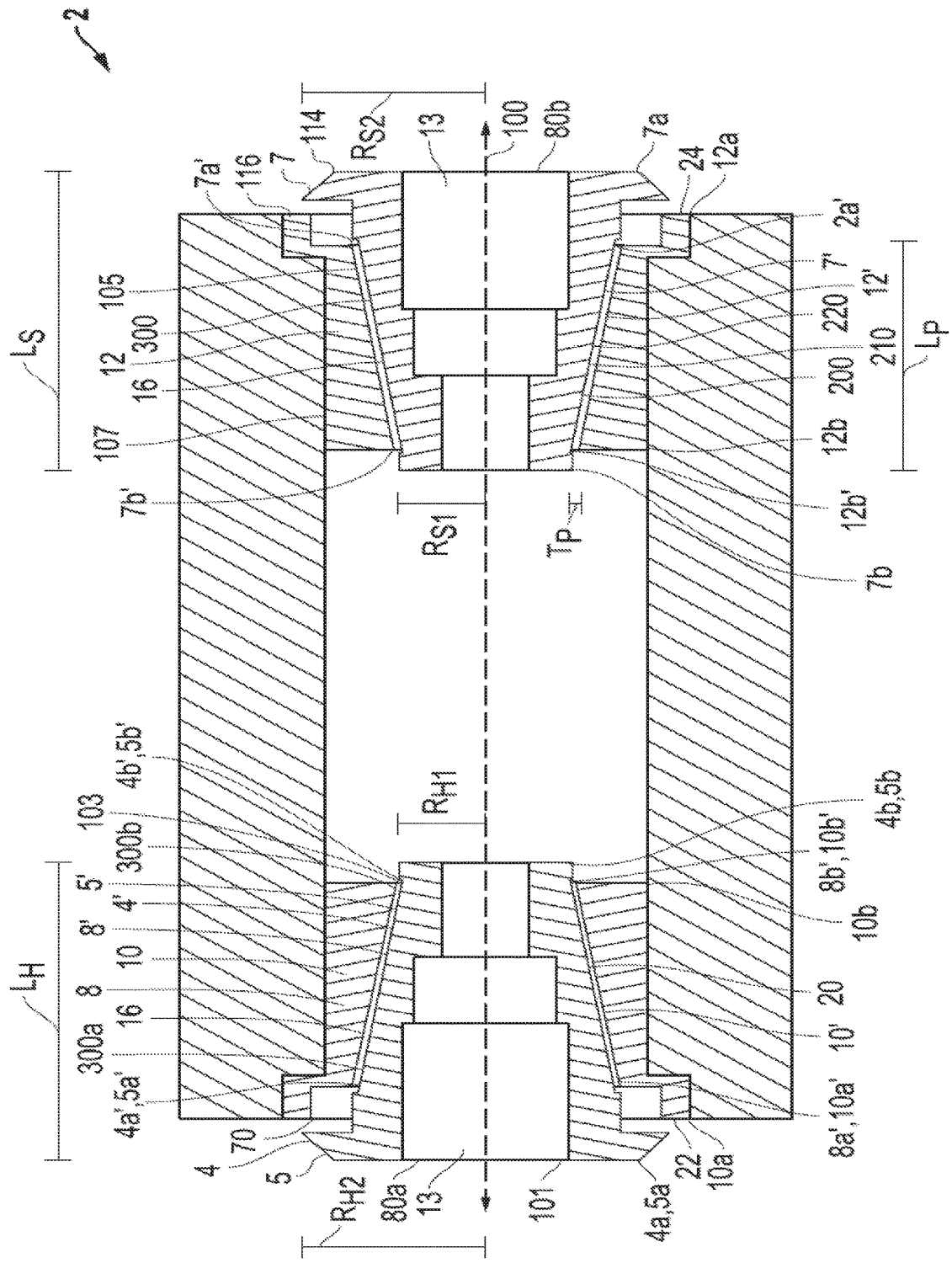
FIG. 1 is perspective view of a joint assembly according to an embodiment of the invention.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the joint assembly and torque adjustable component arts.

Referring initially to FIGS. 1 and 3-5, a joint assembly 2 generally includes an inner component and an outer component directed along a central axis 100 that axially down the cross-section of the joint assembly. In an embodiment, the inner component may be in the form of a shaft 4 having a first end 4a and a second end 4b. In another embodiment, a torque supplying input or torque receiving output can be operatively connected to or engaged with the shaft 4. The shaft 4 may be a single solid component piece. In an embodiment the shaft 4 may include subcomponents including, but not limited to, a first shaft 5 and a second shaft 7. The first shaft 5 may have a first axial end 5a and a second axial end 5b along the axial length of the first shaft 5. The second shaft 7 may have a first axial end 7a and a second axial end 7b along the axial length of the second shaft 7. In an embodiment the shaft 4 may have an inner diameter portion 101 and an outer diameter portion 103. The shaft 4 may have a tapered surface 4'. The tapered surface 4' may have a first axial end 4'a and a second axial end 4'b. The tapered surface 4' may be on at least one of the inner diameter portion 101 or the outer diameter portion 103 of the shaft 4. In an embodiment the first shaft 5 may have a tapered surface 5', and/or the second shaft 7 may have a tapered surface 7'. The tapered surface 5' may have a first axial end 5'*a* and a second axial end 5'*b*. The tapered surface 7' may have a first axial end 7'*a* and a second axial end 7'*b*. In an embodiment the tapered surface 5' may be on at least one of the inner diameter portion 101 or the outer diameter portion 103 of the first shaft 5. In an embodiment the tapered surface 7' may be on at least one of the inner diameter portion 101 or the outer diameter portion 103 of the second shaft 7. In an embodiment, the first shaft 5 and the second shaft 7 may be substantially identical components that may be interchangeable within the joint assembly 2. In an embodiment, at least one of the shaft 4, first shaft 5, or second shaft 7 may include an internal bore 13 from the first axial end 4*a*, 5*a*, 7*a* to the second axial end 4*b*, 5*b*, 7*b* along the axial length.

In an embodiment, the shaft 4 may be made of a material conventional in the art such as, but not limited to, a metal or metal alloy, a polymer, or a composite material. The shaft 4 may be a metal including steel, aluminum, bronze, stainless steel, nickel, copper, tin, titanium, platinum, tungsten, or may be another type. The shaft 4 may include a carbon based compound. In an embodiment, the shaft 4 may be manufactured by a method conventional in the art such as, but not limited to, metalworking, forming, forging, extrusion, molding, printing, or may be another type.

In an embodiment, the outer component may be in the form of a housing 8. In another embodiment, the torque receiving input or output can be operatively connected to or engaged with the housing 8. The housing 8 may be a single solid component piece. In an embodiment the housing 8 may include subcomponents including, but not limited to, a first housing 10 and a second housing 12. The first housing 10 may have a first axial end 10*a* and a second axial end 10*b* along the axial length of the first housing 10. The second housing 12 may have a first axial end 12*a* and a second axial end 12*b* along the axial length of the second housing 12. In an embodiment the housing 8 may have an inner diameter portion 105 and an outer diameter portion 107. The housing 8 may have a tapered surface 8'. The tapered surface 8' may have a first axial end 8'*a* and a second axial end 8'*b*. The tapered surface 10' may have a first axial end 10'*a* and a second axial end 10'*b*. The tapered surface 12' may have a first axial end 12'*a* and a second axial end 12'*b*. The tapered surface 8' may be on at least one of the inner diameter portion 105 or the outer diameter portion 107 of the housing 8. In an embodiment, the first housing may have a tapered surface 10', and/or the second housing 12 may have a tapered surface 12'. In an embodiment, the tapered surface 10' may be on at least one of the inner diameter portion 105 or the outer diameter portion 107 of the first housing 10. In an embodiment the tapered surface 12' may be on at least one of the inner diameter portion 105 or the outer diameter portion 107 of the second housing 12. In a number of variations, the first housing 10 and the second housing 12 may be substantially identical components that may be interchangeable within the joint assembly 2. In an embodiment, at least one of the housing 8, first housing 10, or second housing 12 may include an internal bore 16 from the first axial end 8*a*, 10*a*, 12*a* to the second axial end 8*b*, 10*b*, 12*b* along the axial length.

In an embodiment, the housing 8 may be made of a material conventional in the art such as, but not limited to, a metal or metal alloy, a polymer, or a composite material. The housing 8 may be a metal including steel, aluminum, bronze, stainless steel, nickel, copper, tin, titanium, platinum, tungsten, or may be another type. The housing 8 may include a carbon based compound. In an embodiment, the housing 8 may be manufactured by a method conventional in the art such as, but not limited to, metalworking, forming, forging, extrusion, molding, printing, or may be another type.

In an embodiment, the torque supplying input and the torque receiving output may be operatively coupled together. The torque supplying input can be coupled to a torque generating device (not illustrated) while the torque receiving output may be coupled to a machine requiring torque (not illustrated). In an embodiment, the torque receiving output may be in the form of or operatively connected to a shaft 4, and the torque supplying input may be in the form of or operatively connected to a housing 8. In another embodiment, the torque receiving output may be in the form of or operatively connected to a housing 8, and the torque supplying input may be in the form of or operatively connected to a shaft 4.

Still referring to FIGS. 1 and 3-5, in an embodiment, the shaft 4 can be receivable into the bore 16 formed in the housing 8. The shaft 4 and the housing 8 can at least partially mate with each other through insertion of the shaft 4 into the bore 16. In an embodiment, the outer diameter portion 103 of the shaft 4 may be complementary in shape to the inner diameter portion 105 of the housing 8. In an embodiment, the inner diameter portion 101 of the shaft 4 may be complementary in shape to the outer diameter portion 107 of the housing 8. In an embodiment, the tapered surface 4' of the shaft 4 be complementary in shape to the tapered surface 8 of the housing 8'. In an embodiment, the tapered surface 5' of the first shaft 5 may be complementary in shape to the tapered surface 10' of the first housing 10'. In an embodiment, the tapered surface 7' of the second shaft 7 may be complementary in shape to the tapered surface 12' of the second housing 12'.

In an embodiment, the tapered surface 4' of the outer diameter portion 103 of the shaft 4 be complementary in shape to the tapered surface 8' of the inner diameter portion 105 of the housing 8. In an embodiment, the tapered surface 5' of the outer diameter portion 103 of the first shaft 5 may be complementary in shape to the tapered surface 10' of the inner diameter portion 105 of the first housing 10'. In an embodiment, the tapered surface 7' of the outer diameter portion 103 of the second shaft 7 may be complementary in shape to the tapered surface 12' of the inner diameter portion 105 of the second housing 12'. In an embodiment, the tapered surface 4' of the inner diameter portion 101 of the shaft 4 be complementary in shape to the tapered surface 8' of the outer diameter portion 107 of the housing 8. In an embodiment, the tapered surface 5' of the inner diameter portion 101 of the first shaft 5 may be complementary in shape to the tapered surface 10' of the outer diameter portion 107 of the first housing 10'. In an embodiment, the tapered surface 7' of inner diameter portion 101 of the second shaft 7 may be complementary in shape to the tapered surface 12' of the outer diameter portion 107 of the second housing 12'. In a number of embodiments, the shaft 4 may rotate relative to the housing 8 within the joint assembly 2. In a number of embodiments, the housing 8 may rotate relative to the shaft 4 within the joint assembly 2.

In an embodiment, at least one of the tapered surface 4' of the shaft 4, tapered surface 5' of the first shaft 5, or the tapered surface 7' of the second shaft 7 may be sloped in the axial direction along it exterior surface. The tapered surface 4' of the shaft 4, tapered surface 5' of the first shaft 5, or the tapered surface 7' of the second shaft 7 may be sloped in the axial direction to form an angle $\alpha$ with respect to a line parallel to the central axis 100. The angle $\alpha$ may be between $1° \leq \alpha \leq 89°$, such $5° \leq \alpha \leq 45°$, such as $5° \leq \alpha \leq 30°$, such as $10° \leq \alpha \leq 30°$. In an embodiment, at least one of the tapered surface 8' of the shaft 8, tapered surface 10' of the first housing 10, or the tapered surface 12' of the second housing 12 may be sloped in the axial direction along it exterior surface. The tapered surface 8' of the shaft 8, tapered surface 10' of the first housing 10, or the tapered surface 12' of the second housing 12 may be sloped in the axial direction to form an angle α with respect to a line parallel to the central axis 100. The angle α may be between $1° \leq \alpha \leq 89°$, such $5° \leq \alpha \leq 45°$, such as $5° \leq \alpha \leq 30°$, such as $10° \leq \alpha \leq 30°$.

In an embodiment, an axial end 4a of the shaft 4 (or any of its subcomponents) may include a flared edge 114. A cross-section of the flared edge 114 may include a circular, polygonal, rounded, oval, or modified rounded shape. In an embodiment, an axial end 8a of the housing 8 (or any of its subcomponents) may include a flared edge 116. A cross-section of the flared edge 116 may include a circular, polygonal, rounded, oval, or modified rounded shape.

In an embodiment, the tapered surface 4' of the shaft 4 or the tapered surface 8' of the housing 8 (or any of their respective subcomponents) may be adapted to adjust or modify torque or frictional fit between the shaft 4 and the housing 8 (or any of their respective subcomponents) by modifying the axial position between the between the shaft 4 and the housing 8 to modify or set a torque value for the joint assembly 2. The polymer layer 20 can be frictionally coupled to at least one of the shaft 4 or the housing 8 (or any of their respective subcomponents). That is, engagement between the polymer layer 20 and one of the shaft 4 or the housing 8 (or any of their respective subcomponents) can occur through frictional resistance. In a number of variations, the tapered surface 4' of the shaft 4 (or any of its subcomponents) may include a radial step 22 formed on the outer diameter portion 103. In a number of variations, the radial step 22 may rigidly or fixedly couple the shaft 4 to the housing 8. In a number of variations, the tapered surface 8' of the housing 8 (or any of its subcomponents) may include a radial step 24 formed on the inner diameter portion 105. In a number of variations, the radial step 24 may rigidly or fixedly couple the shaft 4 to the housing 8.

Still referring to FIGS. 1 and 3-5, the joint assembly 2 may further include a polymer layer 20. In an embodiment, the polymer layer 20 may be coupled to the inner diameter portion 105 of the housing 8 (or any of its respective subcomponents). In an embodiment, the polymer layer 20 may be coupled to the outer diameter portion 101 of the shaft 4 (or any of its respective subcomponents). The polymer layer 20 may be provided between the shaft 4 and the housing 8. The polymer layer 20 may be provided on a tapered surface 4' of the shaft 4. The polymer layer 20 may be provided on at least one of the tapered surface 5' of the first shaft 5 or the tapered surface 7' of the second shaft 7. The polymer layer 20 may be provided on a tapered surface 8' of the housing 8. The polymer layer 20 may be provided on at least one of the tapered surface 10' of the first housing 10 or the tapered surface 12' of the second housing 12. In an embodiment, a first polymer layer 20a may be provided between the first shaft 5 and the housing 10. In an embodiment, a second polymer layer 20b may be provided between the second shaft 7 and the second housing 12. In an embodiment, the polymer layer 20 may have a thickness $T_P$ of at least 0.05 mm, at least 0.10 mm, at least 0.15 mm, at least 0.20 mm, at least 0.30 mm, at least 0.40 mm. The polymer layer 20 may have a thickness $T_P$ may be no greater than 0.5 mm, no greater than 0.10 mm, no greater than 0.15 mm, no greater than 0.20 mm, no greater than 0.30 mm, no greater than 0.40 mm. The thickness $T_P$ may vary along the axial length $L_P$. In an embodiment, the polymer layer 20 can have an axial length, $L_P$, as measured between axial ends 21, 23 of no greater than 5 mm, no greater than 10 mm, no greater than 15 mm, no greater than 20 mm, no greater than 30 mm, no greater than 40 mm. The polymer layer 20 can have an axial length, $L_P$, as measured between axial ends 21, 23 of at least 5 mm, at least 10 mm, at least 15 mm, at least 20 mm, at least 30 mm, at least 40 mm. The thickness $T_P$ may vary along the axial length $L_P$.

In an embodiment, the polymer layer 20 adapted to adjust or modify torque or frictional fit between the shaft 4 and the housing 8 (or any of their respective subcomponents) by modifying the axial position between the between the shaft 4 and the housing 8 (or any of their respective subcomponents) to modify or set a torque value for the joint assembly 2. The polymer layer 20 can be frictionally coupled to at least one of the shaft 4 or the housing 8 (or any of their respective subcomponents). That is, engagement between the polymer layer 20 and one of the shaft 4 or the housing 8 (or any of their respective subcomponents) can occur through frictional resistance. In this way, a frictional fit may be provided between one of the shaft 4 or the housing 8 (or any of their respective subcomponents).

In an embodiment, the polymer layer 20 may be provided in the form of a bearing 200 where the bearing 200 includes a substrate 210 and the secondary polymer layer 220 provided on the substrate 210. In an exemplary embodiment, the substrate 210 can include a metal, for non-limiting example, aluminum, steel, bronze, copper or alloys thereof. In an embodiment, the polymer layer 20 or secondary polymer layer 220 may include a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In an embodiment, the polymer layer 20 or secondary polymer layer 220 may include a fluoropolymer. In an embodiment, the polymer layer 20 or secondary polymer layer 220 may include polytetrafluoroethylene (PTFE), modified polytetrafluoroethylene (mPTFE), ethylene-tetrafluoroethylene (ETFE), perfluoroalkoxyethylene (PFA), tetrafluoroethylene-hexafluoropropylene (FEP), tetrafluoro-ethylene-perfluoro (methyl vinyl ether) (MFA), polyvinylidene fluoride (PVDF), ethylene-chlorotrifluoroethylene (ECTFE), polyimide (PI), polyamidimide (PAI), polyphenylene sulfide (PPS), polyethersulofone (PES), polyphenylene sulfone (PPSO2), liquid crystal polymers (LCP), polyetherketone (PEK), polyether ether ketones (PEEK), aromatic polyesters (Ekonol), of polyether-etherketone (PEEK), polyetherketone (PEK), liquid crystal polymer (LCP), polyimide (PA), polyoxymethylene (POM), polyethylene (PE)/UHMPE, polypropylene (PP), polystyrene, styrene butadiene copolymers, polyesters, polycarbonate, polyacrylonitriles, polyamides, styrenic block copolymers, ethylene vinyl alcohol copolymers, ethylene vinyl acetate copolymers, polyesters grafted with maleic anhydride, poly-vinylidene chloride, aliphatic polyketone, liquid crystalline polymers, ethylene methyl acrylate copolymer, ethylene-norbomene copolymers, polymethylpentene and ethylene acyrilic acid copolymer, mixtures, copolymers and any combination thereof. In an embodiment, the polymer layer 20 can be provided to fit the shaft 4 and the housing 8 8 (or any of their respective subcomponents) together to provide a frictional fit between the shaft 4 or the housing 8 (or any of their respective subcomponents).

In a particular aspect, the polymer layer 20 or secondary polymer layer 220 can include one or more fillers such as graphite, glass, aromatic polyester (EKONOL®), bronze, zinc, boron nitride, carbon and/or polyimide. Moreover, in one aspect, the polymer layer 20 or secondary polymer layer 220 include both graphite and polyester fillers. Concentrations of each of these fillers in a polymer such as PTFE may be greater than 1%, greater than 5%, greater than 10%, greater than 20% or greater than 25% by weight. Additional layers, such as a bronze mesh between the metal and the fluoropolymer, or embedded in the fluoropolymer, can also be used. Examples of such materials can include the NORGLIDE® line of products available from Saint-Gobain Performance Plastics Inc. Suitable examples of NORGLIDE products include NORGLIDE PRO, M, SM, T and SMTL.

In an embodiment, the shaft 4, first shaft 5, or second shaft 7 may have an inner radius $R_{S1}$ of at least 2.5 mm, at least 5 mm, at least 10 mm, at least 15 mm, at least 20 mm, at least 30 mm, at least 40 mm. The inner radius $R_{S1}$ may be no greater than 5 mm, no greater than 10 mm, no greater than 15 mm, no greater than 20 mm, no greater than 30 mm, no greater than 40 mm. In an embodiment, the shaft 4, first shaft 5, or second shaft 7 may have an outer radius $R_{S2}$ of at least 5 mm, at least 10 mm, at least 15 mm, at least 20 mm, at least 30 mm, at least 40 mm. The outer radius $R_{S2}$ may be no greater than 5 mm, no greater than 10 mm, no greater than 15 mm, no greater than 20 mm, no greater than 30 mm, no greater than 40 mm. In an embodiment, the shaft 4, first shaft 5, or second shaft 7 can have an axial length, $L_S$, as measured between axial ends (4a, 4b for shaft 4; 5a, 5b for first shaft 5; 7a, 7b for second shaft) of no greater than 5 mm, no greater than 10 mm, no greater than 15 mm, no greater than 20 mm, no greater than 30 mm, no greater than 40 mm. The shaft 4, first shaft 5, or second shaft 7 can have an axial length, $L_S$, as measured between axial ends (4a, 4b for shaft 4; 5a, 5b for first shaft 5; 7a, 7b for second shaft) of at least 5 mm, at least 10 mm, at least 15 mm, at least 20 mm, at least 30 mm, at least 40 mm. The inner radius $R_{S1}$ may vary along the axial length $L_S$. The outer radius $R_{S2}$ may vary along the axial length $L_S$.

In an embodiment, the housing 8, first housing 10, or second housing 12 may have an inner radius $R_{H1}$ of at least 2.5 mm, at least 5 mm, at least 10 mm, at least 15 mm, at least 20 mm, at least 30 mm, at least 40 mm. The inner radius $R_{H1}$ may be no greater than 5 mm, no greater than 10 mm, no greater than 15 mm, no greater than 20 mm, no greater than 30 mm, no greater than 40 mm. In an embodiment, the housing 8, first housing 10, or second housing 12 may have an outer radius $R_{H2}$ of at least 5 mm, at least 10 mm, at least 15 mm, at least 20 mm, at least 30 mm, at least 40 mm. The outer radius $R_{H2}$ may be no greater than 5 mm, no greater than 10 mm, no greater than 15 mm, no greater than 20 mm, no greater than 30 mm, no greater than 40 mm. In an embodiment, the housing 8, first housing 10, or second housing 12 can have an axial length, $L_H$, as measured between axial ends (8a, 8b for housing 8; 10a, 10b for first housing 10; 12a, 12b for second housing 12) of no greater than 5 mm, no greater than 10 mm, no greater than 15 mm, no greater than 20 mm, no greater than 30 mm, no greater than 40 mm. The housing 8, first housing 10, or second housing 12 can have an axial length, $L_H$, as measured between axial ends (8a, 8b for housing 8; 10a, 10b for first housing 10; 12a, 12b for second housing 12) of at least 5 mm, at least 10 mm, at least 15 mm, at least 20 mm, at least 30 mm, at least 40 mm. The inner radius $R_{H1}$ may vary along the axial length $L_S$. The outer radius $R_{H2}$ may vary along the axial length $L_S$.

Still referring to FIGS. 1 and 3-5, in an embodiment, the joint assembly 2 can include a connecting component 50. The connecting component 50 may have a first axial end 51 and a second axial end 53 along the axial length. The connecting component 50 may connect the first shaft 5 to the second shaft 7. In an embodiment, the connecting component 50 may connect the first housing 10 to the second housing 12. In an embodiment, the connecting component 50 may include screw threads or other form of threads, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, hole and screw combination, or may be coupled a different way. In an embodiment, the inner diameter portion 101 or outer diameter portion 103 of at least one of the first shaft 5 or the second shaft 7 may couple to the connecting component 50 through screw threads or other form of threads, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, hole and screw combination, or may be coupled a different way. In an embodiment, the inner diameter portion 105 or outer diameter portion 107 of at least one of the first housing 10 or the second housing 12 may couple to the connecting component 50 through screw threads or other form of threads, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, hole and screw combination, or may be coupled a different way. In an embodiment, screw threads of the connecting component 50 may couple to screw threads on the inner diameter portion 101 of the first shaft 5 and the second shaft 7 through the bore 13. In an embodiment, screw threads of the connecting component 50 may couple to screw threads on the outer diameter portion 103 of the first shaft 5 and the second shaft 7. In an embodiment, screw threads of the connecting component 50 may couple to screw threads on the inner diameter portion 105 of the first housing 10 and the second housing 12 through the bore 16. In an embodiment, screw threads of the connecting component 50 may couple to screw threads on the outer diameter portion 107 of the first housing 10 and the second housing 12. In a number of embodiments, the connecting component 50 may extend through each of the first shaft 5 and the second shaft 7 and be adapted to provide a biasing force to fix the axial position of the first shaft 5 and the second shaft 8 relative to the first housing 10 and the second housing 12 respectively. In an embodiment, the connecting component 50 may include a threaded screw having a head portion 52 and a thread portion 54.

In an embodiment, the connecting component 50 may have a radius $R_C$ of at least 1.5 mm, at least 2.5 mm, at least 5 mm, at least 10 mm, at least 15 mm, at least 20 mm, at least 30 mm, at least 40 mm. The radius $R_C$ may be no greater than 5 mm, no greater than 10 mm, no greater than 15 mm, no greater than 20 mm, no greater than 30 mm, no greater than 40 mm. In an embodiment, the connecting component 50 may can have an axial length, $L_C$, as measured between axial ends 51, 53 of no greater than 5 mm, no greater than 10 mm, no greater than 15 mm, no greater than 20 mm, no greater than 30 mm, no greater than 40 mm. The connecting component 50 may can have an axial length, $L_C$, as measured between axial ends 51, 53 of at least 5 mm, at least 10 mm, at least 15 mm, at least 20 mm, at least 30 mm, at least 40 mm. The radius $R_C$ may vary along the axial length $L_C$.

Figure 3:
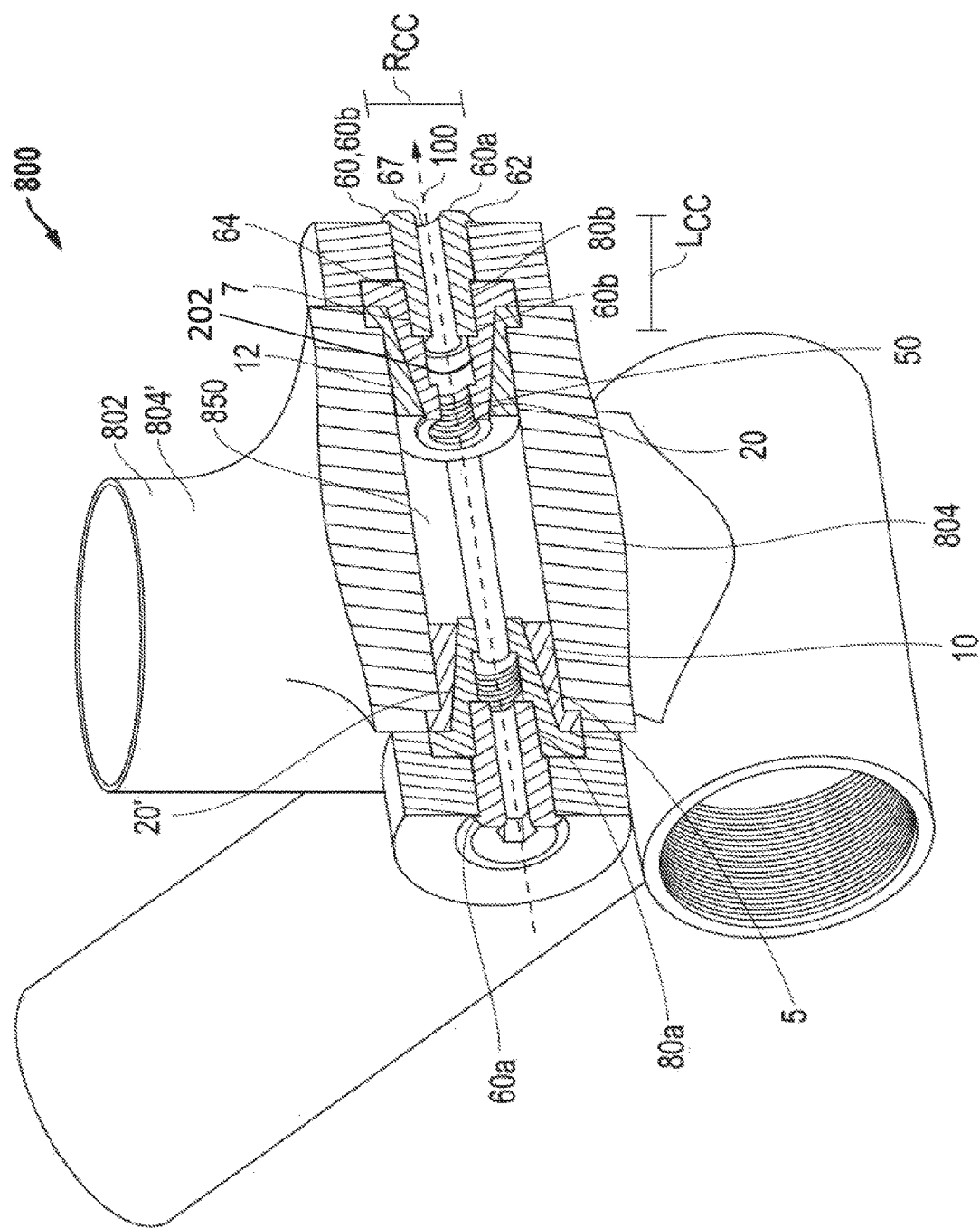
FIG. 3 is a cross-sectional view of a joint assembly according to an embodiment of the invention.
Figure 5:
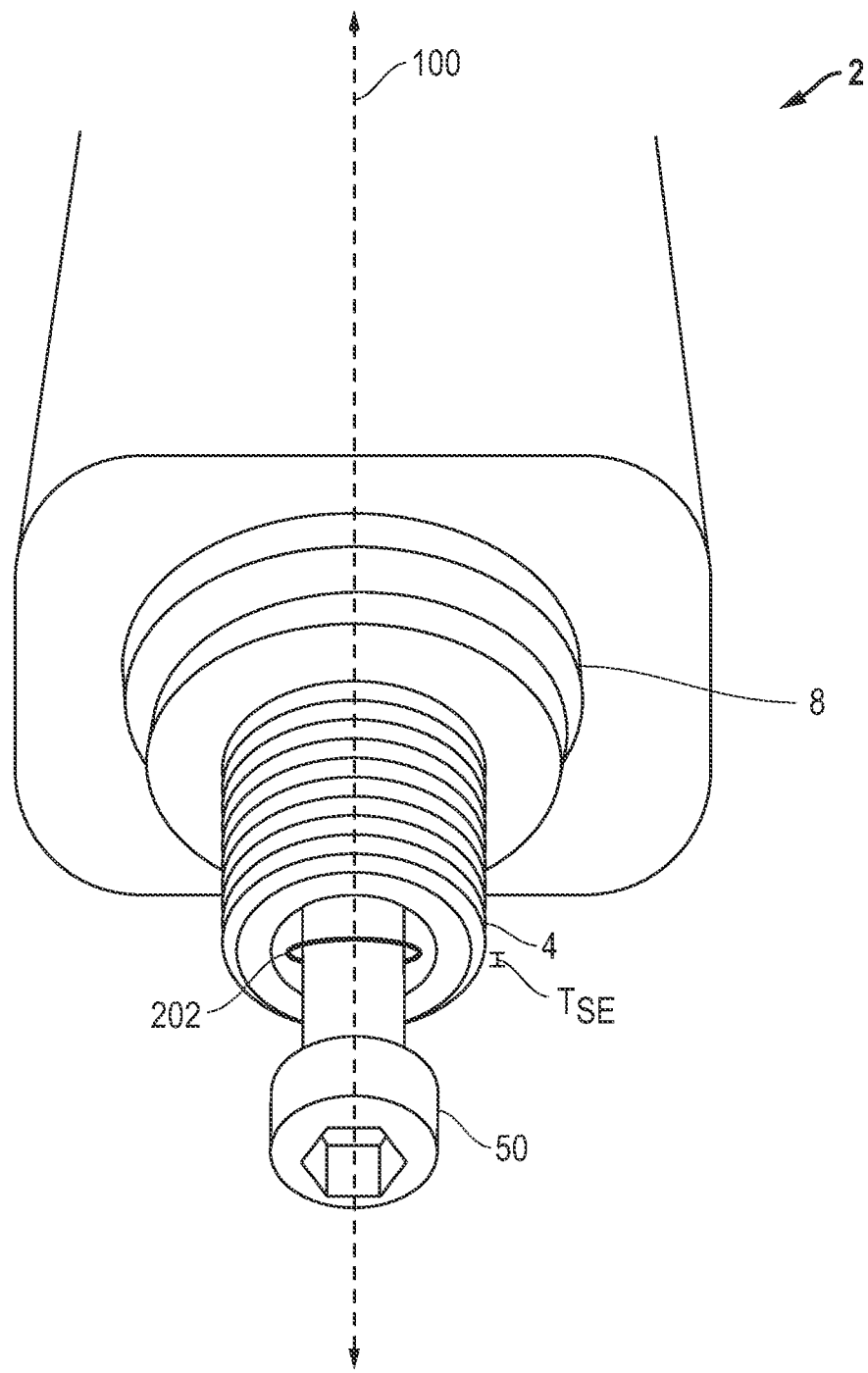
FIG. 5 is a cut-away unassembled end view of a joint assembly according to an embodiment of the invention.

Referring to FIG. 3, in an embodiment, the joint assembly 2 can include at least one cap component 60. The cap component 60 may have a first axial end 61a and a second axial end 61b along the axial length. The cap component 60 may have an internal bore 67 from the first axial end 61a to the second axial end 61b along the axial length. The internal bore 67 may be threaded at a first axial end 61a to pair with another component (not shown). The internal bore 67 may have a polygonal or non-round cross-section to pair with another component (not shown). The cap component 60 may cap the first shaft 5 or the second shaft 7. In an embodiment, the cap component 60 may cap the first housing 10 or the second housing 12. In an embodiment, the cap component 60 may include screw threads or other form of threads, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, hole and screw combination, or may be coupled a different way. In an embodiment, the inner diameter portion 101 or outer diameter portion 103 of at least one of the first shaft 5 or the second shaft 7 may couple to the cap component 60 through screw threads or other form of threads, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, hole and screw combination, or may be coupled a different way. In an embodiment, the inner diameter portion 105 or outer diameter portion 107 of at least one of the first housing 10 or the second housing 12 may couple to the cap component 60 through screw threads or other form of threads, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, hole and screw combination, or may be coupled a different way. In an embodiment, screw threads of the cap component 60 may couple to screw threads on the inner diameter portion 101 of the first shaft 5 and the second shaft 7. In an embodiment, screw threads of the cap component 60 may couple to screw threads on the outer diameter portion 103 of the first shaft 5 and the second shaft 7. In an embodiment, screw threads of the cap component 60 may couple to screw threads on the inner diameter portion 105 of the first housing 10 and the second housing 12. In an embodiment, screw threads of the cap component 60 may couple to screw threads on the outer diameter portion 107 of the first housing 10 and the second housing 12. In a number of embodiments, the cap component 60 may cap an axial end 4a, 4b of the shaft 4 (or at least one of the first shaft 5 or the second shaft 7). In a number of embodiments, the cap component 60 may cap an axial end 8a, 8b of the housing 8 (or at least one of the first housing 10 or the second housing 12). In an embodiment, the cap component 60 may include a threaded screw having a head portion 62 and a thread portion 64. In a number of embodiments, a first cap component 60a may couple to an outer bore 80a of the bore 13 in the first shaft 5. The first cap component 60a may be coupled to the first shaft 5 through matching screw threads 133. In a number of embodiments, a second cap component 60b may couple to an outer bore 80b of the bore 13 in the second shaft 7. The second cap component 60b may be coupled to the second shaft 7 through matching screw threads 135.

In an embodiment, the cap component 60 may have a radius $R_{CC}$ of at least 2.5 mm, at least 5 mm, at least 10 mm, at least 15 mm, at least 20 mm, at least 30 mm, at least 40 mm. The radius $R_{CC}$ may be no greater than 5 mm, no greater than 10 mm, no greater than 15 mm, no greater than 20 mm, no greater than 30 mm, no greater than 40 mm. In an embodiment, the cap component 60 may can have an axial length, $L_{CC}$, as measured between axial ends 51, 53 of no greater than 5 mm, no greater than 10 mm, no greater than 15 mm, no greater than 20 mm, no greater than 30 mm, no greater than 40 mm. The cap component 60 may can have an axial length, $L_{CC}$, as measured between axial ends 51, 53 of at least 5 mm, at least 10 mm, at least 15 mm, at least 20 mm, at least 30 mm, at least 40 mm. The radius $R_{CC}$ may vary along the axial length $L_{CC}$.

In an embodiment, the tapered portion 4' of the shaft 4 (or any of its subcomponents 5', 7') may for an interface 300 with the tapered portion 8' of the shaft 8 (or any of its subcomponents 10' 12'). In an embodiment, the first axial end 4'a of the tapered portion 4' of the shaft 4 (or any of its subcomponents 5'a, 7'a) may form an outer interface 300a with the first axial end 8'a of the tapered portion 8' of the housing 8 (or any of its subcomponents 11'a, 12'a). In an embodiment, the second axial end 4'b of the tapered portion 4' of the shaft 4 (or any of its subcomponents 5'b, 7'b) may form an inner interface 300b with the second axial end 8'b of the tapered portion 8' of the housing 8 (or any of its subcomponents 11'b, 12'b). In an embodiment, at least one of the interface 300, outer interface 300a, or inner interface 300b may be sealed. In an embodiment, at least one of the interface 300, outer interface 300a, or inner interface 300b may be sealed by an annular seal. In an embodiment, at least one of the interface 300, outer interface 300a, or inner interface 300b may be sealed by an annular seal along the substantial circumference of the interface 300, 300a, 300b.

In an embodiment, the torque assembly 2 may include a lubricant on any of its components. The lubricant may include a grease including at least one of lithium soap, lithium disulfide, graphite, mineral or vegetable oil, silicone grease, fluorether-based grease, apiezon, food-grade grease, petrochemical grease, or may be a different type. The lubricant may include an oil including at least one of a Group I-GroupIII+ oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based, or may be a different type. The lubricant may include a solid based lubricant including at least one of lithium soap, graphite, boron nitride, molybdenum disulfide, tungsten disulfide, polytetrafluoroethylene, a metal, a metal alloy, or may be a different type.

In an embodiment, as shown in FIGS. 4, 5, 6A-6B, the joint assembly 2 may further include at least one spring element 202. The spring element 202 may be provided between the shaft 4 (or any of its subcomponents), and the housing 8 (and any of its subcomponents). In an embodiment, as shown in FIG. 3, the spring element 202 may be located between the connecting component 50 and the first shaft 5 or second shaft 7. The spring element 202 may compensate for a drop in torque over the life of the joint assembly 2 between the first or second shafts 5, 7, and the connecting component 50. Further, the spring element 202 may be located between the connecting component 50 and the cap assembly 60a, 60b. The spring element 202 may compensate for a drop in torque over the life of the joint assembly 2 between the cap assembly 60a, 60b and the connecting component 50. In an embodiment, the spring element 202 may have a compound layer 212 thereon. The spring element 202 may be adapted to modify torque between the shaft 4 (or any of its subcomponents), and the housing 8 (and any of its subcomponents). The spring element 202 may be adapted to provide a biasing force such that the shaft 4 (or any of its subcomponents) may be biased against the housing 8 (and any of its subcomponents). The spring element 202 may have a spring force of at least 0.1 N, at least 1 N, at least 5 N, at least 10 N, at least 1000 N, at least 1000 N, at least 10000 N. The spring element 202 may have a spring rate of at least about 1 N/mm, about 10 N/mm, about 25 N/mm, about 50 N/mm, about 100 N/mm, about 200 N/mm, about 500 N/mm, about 1000 N/mm, about 2000 N/mm, about 5000 N/mm, about 10000 N/mm.

In an embodiment, as shown in FIGS. 4, 5, and 6A-6B, the at least one spring element 202 can include a first spring element 202A and a first spring element 202B. The spring element 202 may include a spring element 202 bore 206. In an embodiment, at least one of the spring element 202 (or any of its subcomponents 202A, 202B), may have a radius $R_{SE}$ of at least 0.5 mm, of at least 2 mm, of at least 5 mm, at least 10 mm, at least 15 mm, at least 20 mm, at least 30 mm, at least 40 mm. The radius $R_{SE}$ that may be no greater than 5 mm, no greater than 10 mm, no greater than 15 mm, no greater than 20 mm, no greater than 30 mm, no greater than 40 mm. The spring element 202 (or any of its subcomponents 202A, 202B), may have an axial thickness $T_{SE}$, of at least 0.5 mm, of at least 1 mm, of at least 5 mm, at least 10 mm, at least 15 mm, at least 20 mm, at least 30 mm, at least 40 mm. The axial thickness $T_{SE}$ that may be no greater than 5 mm, no greater than 10 mm, no greater than 15 mm, no greater than 20 mm, no greater than 30 mm, no greater than 40 mm. The radius $R_{SE}$ may vary along the axial length $T_{SE}$.

In an embodiment, spring element 202 (or any of its subcomponents 202A, 202B), may include a compound layer 208 thereon. The compound layer 208 can include two or more layers on an exterior surface 205 of the spring element 202. The compound layer 208 can include a first layer 229 and a second layer 231. The compound layer 208 can include at least one polymer. Exemplary polymers can include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxy alkane (PFA), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The compound layer 22 can include two or more polymers.

In an embodiment, the compound layer 208 further includes at least one filler. The filler can enhance the slip interface of the compound layer 208. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitride, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

In an embodiment, the compound layer 208 may be coupled to a backing layer (not illustrated), or substrate, or be on the surface of the spring element 202 (or any of its subcomponents 202A, 202B), to enhance rigidity and structural support. The compound layer 208 can be applied to the backing layer by a coating technique, such as for example, physical or vapor deposition, spraying, plating, powder coating, or through other chemical or electrochemical techniques. In a certain embodiment, the compound layer 208 can be sintered to the backing layer. In a particular embodiment, the compound layer 208 may be applied by a roll-to-roll coating process, including for example, extrusion coating. The compound layer 208 can be heated to a molten or semi-molten state and extruded through a slot die onto a major surface of the backing layer. In another embodiment, the compound layer 208 can be cast or molded. In an embodiment, the compound layer 208 can be pressed or rolled to the backing layer. In a particular embodiment, pressing or rolling can occur at elevated temperatures, i.e., the compound layer 208 may be hot-pressed or rolled. In some embodiments, an adhesive layer (not illustrated) can be disposed between the compound layer 208 and the backing layer.

Referring back to FIGS. 1 and 3-5, in an embodiment, the joint assembly 2 may include a locking mechanism 70. The locking mechanism 70 may lock the housing 8 (or any of its subcomponents) in place with respect to the shaft 4 (or any of its subcomponents). In an embodiment, the locking mechanism 70 may include a pin, groove and stop, nut and bolt, nut and screw, latch, handle, locking nut, tie rivet, or may be locked another way. As shown in FIG. 1, in at least one embodiment, the locking mechanism 70 may include a radial step 22, 24 to lock the joint assembly 2. In a number of variations, a radial step 24, 22 may rigidly or fixedly couple the shaft 4 to the housing 8.

In an embodiment, as shown in FIG. 3, the joint assembly 2 may be a component within a vehicle subassembly 800. The vehicle subassembly 800 may include a frame 802. The frame may include a plurality of segments 804, 804' as subcomponents. The frame 802 may include a bore 850. In an embodiment, the bore 850 may be located at an intersection of two segments 804. In an embodiment, the joint assembly 2 may be positioned within the bore 850. The joint assembly 2 may be placed within the bore 850 to control, restrict, or allow relative movement between two adjacent segments 804 based on the axial position and frictional fit of the shaft 4 relative to the housing 8 within the joint assembly 2. In a number of embodiments, the joint assembly 2 may rotate relative to the frame 802.

Figure 2:
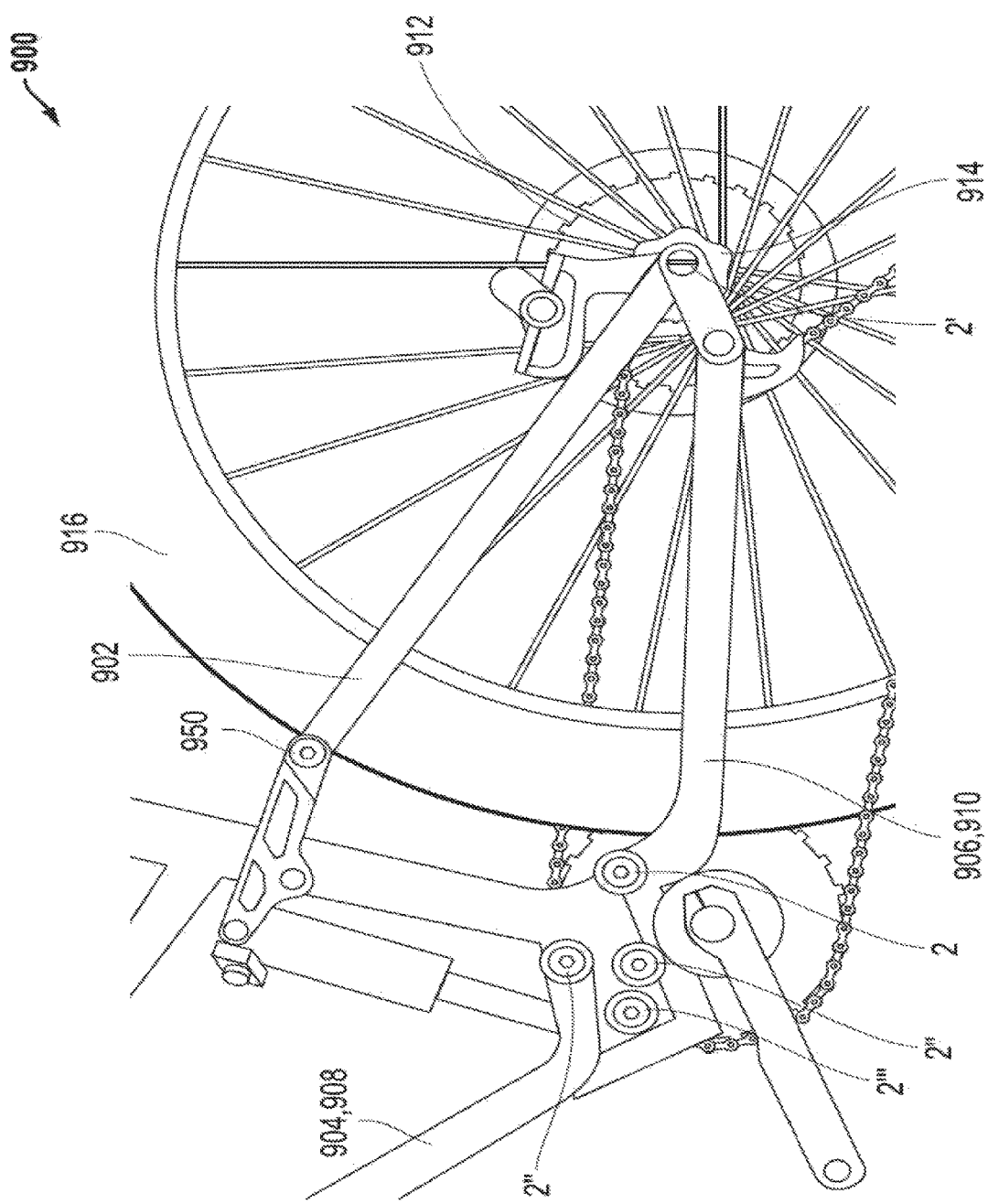
FIG. 2 is a side view of a joint assembly within an assembly or subassembly according to an embodiment of the invention.

In an embodiment, as shown in FIG. 2, the joint assembly 2, 2', 2'', 2''', 2'''' may be a component within a bicycle assembly 900. The bicycle assembly 900 may include a frame 902. In an embodiment, the frame 902 may include a main structure 904 and a support structure 906 as subcomponents. In an embodiment, the main structure 904 may include a main triangle 908. In an embodiment, the support structure 906 may include a paired rear triangle 910. In a number of embodiments, the main structure 904 or main triangle 908 may include a wheel assembly 912. In a number of embodiments, the support structure 906 or paired rear triangle 910 may include a wheel assembly 912. In an embodiment, the wheel assembly 912 may include an axle 914 and a wheel 916. In a number of embodiments, the frame 902 may include a bore 950. The joint assembly 2 may be placed within the bore 950 to control, restrict, or allow relative movement between the main structure 906 and the support structure 906 based on the axial position and frictional fit of the shaft 4 relative to the housing 8 within the joint assembly 2. In an embodiment, the joint assembly 2 may be placed within the bore 950 to control, restrict, or allow relative movement between the main triangle 908 and the paired rear triangle 910 based on the axial position and frictional fit of the shaft 4 relative to the housing 8 within the joint assembly 2. In a number of embodiments, the joint assembly 2 may rotate relative to the frame 902.

A method of assembling and using the torque assembly 2 is recited. In an embodiment, the shaft 4 may be placed within the bore 16 formed in the housing 8. In an embodiment, the first shaft 5 may be placed within the bore 16 formed in the first housing 10. In an embodiment, the second shaft 7 may be placed within the bore 16 formed in the second housing 12. In an embodiment, the connecting component 50 may pair the first shaft 5 with the second shaft 7. The connecting component 50 may pair the first shaft 5 with the second shaft 7 through threadings (or other means) within the bores 13 of the first shaft 5 and the second shaft 7. In an embodiment, the connecting component 50 may be used to adjust the axial position of the first shaft 5 relative to the second shaft 7. In an embodiment, the connecting component 50 may be used to adjust the axial position of the first housing 10 relative to the second housing 12.

In this way, the torque provided from the joint assembly 2 can be adjusted to its desired torque level or torque value based on the desired application of the joint assembly 2. In an embodiment, tightening, loosening, or otherwise engaging of the connecting component 50 to axially move the first shaft 5 (and first housing 10) and the second shaft 7 (and second housing 12) closer together may alter the transmittable torque between the first shaft 5 (and first housing 10) and the second shaft 7 (and second housing 12) to a desired torque level or value within the joint assembly 2. In an embodiment, tightening, loosening, or otherwise engaging of the connecting component 50 to axially move the first housing 10 and the second housing 12 closer together may alter the transmittable torque between the first housing 10 and the second housing 12 to a desired torque level or value within the joint assembly 2 based on the desired application. The torque level or value may be set constant by no further rotation of the connecting component 50 moving the axial position of the first shaft 5 (and first housing 10) and the second shaft 7 (and second housing 12). In an embodiment, the connecting component 50 may be manually tightened to a required torque level or value. In an embodiment, the axial spacing of the shaft 4 (or any of its subcomponents) relative to the housing 8 (or any of its subcomponents) may modify or adjust the torque value between the components of the joint assembly 2. In an embodiment, the axial spacing of the shaft 4 (or any of its subcomponents) relative to the housing 8 (or any of its subcomponents) may modify or adjust the frictional fit between the components of the joint assembly 2.

In an embodiment, the housing 8 may be adapted to have an adjustable torque value or frictional fit to the shaft 4 through the pairing of the tapered surfaces of the shaft 4' coupled to the housing 8'. In an embodiment, the first housing 10 may have an adjustable torque value or frictional fit to the first shaft 5 through the pairing of the tapered surfaces of the first shaft 5' coupled to the first housing 10'. In an embodiment, the second housing 12 may have an adjustable torque value or frictional fit to the second shaft 7 through the pairing of the tapered surfaces of the second shaft 7' coupled to the second housing 12'. In an embodiment, the polymer layer 20 may provide the frictional fit between the shaft 4 (or any of its subcomponents) and the housing 8 (or any of its subcomponents). In an embodiment, this frictional fit may provide a seal between the shaft 4 (or any of its subcomponents) and the housing 8 (or any of its subcomponents). This seal may keep abrasive particles out of the joint assembly 2 (or any of its subcomponents). This seal may keep lubricant from leaking out of the joint assembly 2 (or any of its subcomponents). In an embodiment, the frictional fit may be set to a relative constant between the first shaft 5 and the first housing 10 through a locking at the step 22 of the first shaft 7 with the first housing 10. In an embodiment, the frictional fit may be set to a relative constant between the second shaft 7 and the second housing 12 through a locking at the step 24 of the second shaft 7 with the second housing 12. In an embodiment, the pairing of tapered surfaces of the shaft 4 (or any of its subcomponents) relative to the housing 8 (or any of its subcomponents) may modify or adjust the torque value between the components of the joint assembly 2. In an embodiment, the pairing of tapered surfaces of the shaft 4 (or any of its subcomponents) relative to the housing 8 (or any of its subcomponents) may modify or adjust the frictional fit between the components of the joint assembly 2.

In an embodiment, the cap component 60 may be coupled to the shaft 4 through the bore 13 in the shaft 4. In an embodiment, threadings in the cap component 60 may couple to matching treads in the bore 13 of the shaft. In an embodiment, a cap component 60 may be coupled to the first shaft 5 while a second cap component 60' may be coupled to the second shaft 7. In an embodiment, the joint assembly 2 may be assembled or installed within a bore 850 in the frame 802 of a vehicle subassembly 800. In an embodiment, the joint assembly 2 may be assembled or installed within a bore 950 in the frame 902 of a bicycle assembly 900.

In an embodiment, the joint assembly 2 can be installed or assembled by an assembly force of at least 1 kgf in a longitudinal direction relative to the shaft 4 or housing 8, such as at least 2 kgf, at least 3 kgf, at least 4 kgf, at least 5 kgf, at least 10 kgf, or even at least 15 kgf. In a further embodiment, the torque assembly 2 can be installed or assembled by an assembly force of no greater than 20 kg in a longitudinal direction to the housing 8, such as no greater than 19 kgf, no greater than 18 kgf, no greater than 17 kgf, or even no greater than 16 kgf.

The provided joint assembly 2 may enable rotary joints to have smaller packaging, increased stiffness, and simplified service within an application while maintaining low friction, sealing, and durability of the joint assembly 2, frame 802, 902, or any subcomponents of either. The joint assembly may provide longer life of the frame 802, 902, easier fit, be noise free, and provide space and weight savings within the bicycle assembly 900 or vehicle subassembly 800.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A joint assembly comprising: a housing comprising an inner diameter portion having a tapered surface; and at least one shaft having an outer diameter portion having a tapered surface that is complementary in shape to the inner diameter portion of the housing, wherein at least one of the shaft or the housing is adapted to rotate relative to the other, and wherein the frictional fit is adjustable by modifying the axial position of the shaft relative to the housing.

Embodiment 2

A bicycle assembly comprising: a bicycle frame comprising: a main structure and a support structure comprising a wheel assembly; and a joint assembly located within the bicycle frame adapted to modify the position of the wheel assembly to the main assembly, the joint assembly comprising: a housing comprising an inner diameter portion having a tapered surface; and at least one shaft having an outer diameter portion having a tapered surface that is complementary in shape to the inner diameter portion of the housing, wherein at least one of the shaft or the housing is adapted to rotate relative to the other, and wherein the frictional fit is adjustable by modifying the axial position of the shaft relative to the housing.

Embodiment 3

A vehicle subassembly comprising: a frame; and a component rotatably attached to the frame by a joint assembly located within the frame, the joint assembly comprising: a housing comprising an inner diameter portion having a tapered surface; and at least one shaft having an outer diameter portion having a tapered surface that is complementary in shape to the inner diameter portion of the housing, wherein at least one of the shaft or the housing is adapted to rotate relative to the other, and wherein the frictional fit is adjustable by modifying the axial position of the shaft relative to the housing.

Embodiment 4

A method comprising: providing a jointed apparatus comprising a frame having a bore; fitting a joint assembly within the bore of the frame, the joint assembly comprising: a housing comprising an inner diameter portion having a tapered surface; and at least one shaft having an outer diameter portion having a tapered surface that is complementary in shape to the inner diameter portion of the housing, wherein at least one of the shaft or the housing is adapted to rotate relative to the other; and adjusting a position of the shaft within the housing to provide a frictional fit between the housing and the shaft.

Embodiment 5

The joint assembly, bicycle frame assembly, vehicle subassembly, or method of any one of the preceding embodiments, further comprising a polymer layer between the shaft and the housing.

Embodiment 6

The joint assembly, bicycle frame assembly, vehicle subassembly, or method of embodiment 5, wherein the polymer layer comprises a fluorinated polymer.

Embodiment 7

The joint assembly, bicycle frame assembly, vehicle subassembly, or method of any of embodiments 5-6, wherein the polymer layer is coupled to the inner diameter portion of the housing.

Embodiment 8

The joint assembly, bicycle frame assembly, vehicle subassembly, or method of any of embodiments 5-7, wherein the polymer layer is coupled to the outer diameter portion of the shaft.

Embodiment 9

The joint assembly, bicycle frame assembly, vehicle subassembly, or method of any of embodiments 5-8, wherein the polymer layer is provided in the form of a bearing, the bearing including a substrate on which the polymer layer is provided.

Embodiment 10

The joint assembly, bicycle frame assembly, vehicle subassembly, or method of embodiment 9, further comprising a step formed in the tapered surface of the shaft or tapered surface of the housing to prevent axial movement of the bearing.

Embodiment 11

The joint assembly, bicycle frame assembly, vehicle subassembly, or method of any of embodiments 1-10, wherein the at least one housing comprises a first housing and a second housing.

Embodiment 12

The joint assembly, bicycle frame assembly, vehicle subassembly, or method of any of embodiments 1-11, wherein the at least one shaft comprises a first shaft and a second shaft.

Embodiment 13

The joint assembly, bicycle frame assembly, vehicle subassembly, or method of any of embodiments 1-12, wherein the shaft comprises a connecting component connecting the first shaft to the second shaft.

Embodiment 14

The joint assembly, bicycle frame assembly, vehicle subassembly, or method of embodiment 13, wherein the connecting component extends through each of the first and second shafts and is adapted to provide a biasing force to fix the axial position of the first and second shafts relative to the first and second housings respectively.

Embodiment 15

The joint assembly, bicycle frame assembly, vehicle subassembly, or method of any of embodiments 1-14, wherein the tapered surface of the inner diameter portion of the at least one housing has an angle $\alpha$ relative to an axis of the housing, wherein $1°\leq\alpha\leq89°$, such $5°\leq\alpha\leq45°$, such as $5°\leq\alpha\leq30°$, such as $10°\leq\alpha\leq30°$.

Embodiment 16

The joint assembly, bicycle frame assembly, vehicle subassembly, or method of any of embodiments 1-15, wherein the tapered surface of the outer diameter of the at least one shaft has an angle $\alpha$ relative to an axis of the housing, wherein $1°\leq\alpha\leq89°$, such $5°\leq\alpha\leq45°$, such as $5°\leq\alpha\leq30°$, such as $10°\leq\alpha\leq30°$.

Embodiment 17

The joint assembly, bicycle frame assembly, vehicle subassembly, or method of any of embodiments 1-16, wherein the shaft comprises a metal.

Embodiment 18

The joint assembly, bicycle frame assembly, vehicle subassembly, or method of any of embodiments 1-17, wherein the housing comprises a metal.

Embodiment 19

The joint assembly, bicycle frame assembly, vehicle subassembly, or method of any of embodiments 1-18, wherein the at least one of the housing or at least one shaft further comprises a lubricant disposed at an interface between housing and shaft.

Embodiment 20

The joint assembly, bicycle frame assembly, vehicle subassembly, or method of any of embodiments 1-19, wherein the tapered portion of the shaft has an inner end and an outer end, the housing has an inner end and outer end, and at least one of an outer interface between the tapered portion of the shaft and the housing at the outer end or an inner interface between the tapered portion of the shaft and the housing at the inner end, wherein at least one of an outer or inner interface is sealed.

Embodiment 21

The joint assembly, bicycle frame assembly, vehicle subassembly, or method of embodiment 20, wherein the outer interface or inner interface between the shaft and the housing is sealed with an annular seal.

Embodiment 22

The bicycle frame assembly of embodiments 2 and 5-21, wherein the joint assembly is provided as a rocker pivot, main pivot, chain stay pivot, or pull leverage pivot of the bicycle frame assembly.

Embodiment 23

The joint assembly, bicycle frame assembly, vehicle subassembly, or method of any of embodiments 1-22, wherein the shaft can be readjusted within the housing to provide a frictional fit and axial force between the housing and the shaft.

Embodiment 24

The joint assembly, bicycle frame assembly, vehicle subassembly, or method of any of embodiments 1-23, further comprising at least one spring element to provide a biasing force such that the shaft is biased against the housing.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A joint assembly comprising:
   a housing comprising an inner diameter portion having a tapered surface; and
   at least one shaft having an outer diameter portion having a tapered surface that is complementary in shape to the inner diameter portion of the housing, wherein at least one of the shaft or the housing is adapted to rotate relative to the other, and wherein a frictional fit is adjustable by modifying the axial position of the shaft relative to the housing, and further comprising a step formed in the tapered surface of the shaft and the tapered surface of the housing, wherein the step formed in the tapered surface of the housing is oriented such that the outermost radial surface of the step is disposed on the outermost axial surface of the housing.

2. The joint assembly of claim 1, further comprising a polymer layer between the shaft and the housing.

3. The joint assembly of claim 2, wherein the polymer layer comprises a fluorinated polymer.

4. The joint assembly of claim 2, wherein the polymer layer is coupled to the inner diameter portion of the housing.

5. The joint assembly of claim 2, wherein the polymer layer is coupled to the outer diameter portion of the shaft.

6. The joint assembly of claim 2, wherein the polymer layer is provided in the form of a bearing, the bearing including a substrate on which the polymer layer is provided.

7. The joint assembly of claim 1, wherein the at least one housing comprises a first housing and a second housing.

8. The joint assembly of claim 1, wherein the at least one shaft comprises a first shaft and a second shaft.

9. The joint assembly of claim 1, wherein the shaft comprises a connecting component connecting a first shaft to a second shaft.

10. The joint assembly of claim 9, wherein the connecting component extends through each of the first and second shafts and is adapted to provide a biasing force to fix the axial position of the first and second shafts relative to the first and second housings respectively.

11. The joint assembly of claim 1, wherein the shaft comprises a connecting component connecting a first shaft to a second shaft, wherein the connecting component comprises screw threads.

12. A bicycle assembly comprising:
a bicycle frame comprising: a main structure and a support structure comprising a wheel assembly; and
a joint assembly located within the bicycle frame adapted to modify the position of the wheel assembly to the main assembly, the joint assembly comprising:
a housing comprising an inner diameter portion having a tapered surface; and
at least one shaft having an outer diameter portion having a tapered surface that is complementary in shape to the inner diameter portion of the housing, wherein at least one of the shaft or the housing is adapted to rotate relative to the other, and wherein a frictional fit is adjustable by modifying the axial position of the shaft relative to the housing, and further comprising a step formed in the tapered surface of the shaft and the tapered surface of the housing, wherein the step formed in the tapered surface of the housing is oriented such that the outermost radial surface of the step is disposed on the outermost axial surface of the housing.

13. The bicycle frame assembly of claim 12, wherein the tapered surface of the inner diameter portion of the at least one housing has an angle α relative to an axis of the housing, wherein 1°≤α≤89°.

14. The bicycle frame assembly of claim 12, wherein the tapered surface of the outer diameter of the at least one shaft has an angle α relative to an axis of the housing, wherein 1≤α≤89°.

15. The bicycle frame assembly of claim 12, wherein the at least one of the housing or at least one shaft further comprises a lubricant disposed at an interface between housing and shaft.

16. The bicycle frame assembly of claim 12, wherein the tapered portion of the shaft has an inner end and an outer end, the housing has an inner end and outer end, and at least one of an outer interface between the tapered portion of the shaft and the housing at the outer end or an inner interface between the tapered portion of the shaft and the housing at the inner end, wherein at least one of an outer or inner interface is sealed.

17. The bicycle frame assembly of claim 16, wherein the outer interface or inner interface between the shaft and the housing is sealed with an annular seal.

18. The bicycle frame assembly of claim 12, wherein the at least one shaft can be readjusted within the housing to provide a frictional fit and axial force between the housing and the shaft.

19. The bicycle frame assembly of claim 12, further comprising at least one spring element to provide a biasing force such that the shaft is biased against the housing.

20. A vehicle subassembly comprising:
a frame; and
a component rotatably attached to the frame by a joint assembly located within the frame, the joint assembly comprising:
a housing comprising an inner diameter portion having a tapered surface; and
at least one shaft having an outer diameter portion having a tapered surface that is complementary in shape to the inner diameter portion of the housing, wherein at least one of the shaft or the housing is adapted to rotate relative to the other, and wherein a frictional fit is adjustable by modifying the axial position of the shaft relative to the housing, and further comprising a step formed in the tapered surface of the shaft and the tapered surface of the housing, wherein the step formed in the tapered surface of the housing is oriented such that the outermost radial surface of the step is disposed on the outermost axial surface of the housing.

* * * * *